US012752911B2

(12) United States Patent
Hancock et al.

(10) Patent No.: US 12,752,911 B2
(45) Date of Patent: Oct. 6, 2026

(54) AIRCRAFT

(71) Applicant: Airbus Operations Limited, Bristol (GB)

(72) Inventors: Nicholas Hancock, Bristol (GB); Christopher James Perkins, Bristol (GB)

(73) Assignee: Airbus Operations Limited, Bristol (GB)

(*) Notice: Subject to any disclaimer, the term of this patent is extended or adjusted under 35 U.S.C. 154(b) by 0 days.

(21) Appl. No.: 19/307,180

(22) Filed: Aug. 22, 2025

(65) Prior Publication Data

US 2026/0091868 A1 Apr. 2, 2026

(30) Foreign Application Priority Data

Sep. 27, 2024 (GB) .................................... 2414202

(51) Int. Cl.
*B64C 25/14* (2006.01)
*B64C 25/22* (2006.01)

(52) U.S. Cl.
CPC .............. *B64C 25/14* (2013.01); *B64C 25/22* (2013.01)

(58) Field of Classification Search
CPC ................................ B64C 25/14; B64C 25/22
See application file for complete search history.

(56) References Cited

U.S. PATENT DOCUMENTS

| | | | | |
|---|---|---|---|---|
| 4,561,612 A * | 12/1985 | Masclet | B64C 25/14 244/104 FP |
| 4,720,063 A * | 1/1988 | James | B64C 25/14 244/102 R |
| 11,827,342 B2 * | 11/2023 | Dahl | B64C 25/04 |
| 2006/0049309 A1 * | 3/2006 | Hershberger | B64C 25/50 244/102 R |

FOREIGN PATENT DOCUMENTS

| | | |
|---|---|---|
| CN | 213974442 U | 8/2021 |
| CN | 115817803 A | 3/2023 |
| EP | 0614804 A1 | 9/1994 |
| GB | 556550 A | 10/1943 |
| GB | 1128829 A | 10/1968 |

OTHER PUBLICATIONS

United Kingdom Intellectual Property Office Search Report in GB Application No. 2414202.8 dated Feb. 28, 2025, 4 pages.

* cited by examiner

*Primary Examiner* — Tye William Abell
(74) *Attorney, Agent, or Firm* — KDW Firm PLLC

(57) ABSTRACT

An aircraft has a landing gear with a main leg, a support leg, and a wheel arm which has a wheel support and is pivotably connected to the main leg and support leg. The main leg and support leg are pivotably connected to the airframe of the aircraft, and can be pivoted aft to move the wheel arm aft and upward and move the landing gear from a deployed configuration to a stowed configuration. With the landing gear in the deployed configuration, the support leg is positioned forward of the main leg. The main leg, support leg (Continued)

and wheel arm form a triple-rocker four bar linkage such that pivoting the main leg and support leg aft pivots the wheel arm and retracts the wheel support.

15 Claims, 6 Drawing Sheets

AIRCRAFT

TECHNICAL FIELD

The present disclosure relates to the field of aircraft landing gear. It relates particularly, but not exclusively, to an aircraft, a landing gear for such an aircraft, and a method of retracting a landing gear.

BACKGROUND

In many aircraft the landing gear is stowable into the body of the aircraft, for instance into the fuselage or into a wing. This can place contrasting design constraints on the landing gear. On the one hand, when deployed it must extend from the airframe of the aircraft over a length that is sufficient to give the aircraft a suitable ground clearance. On the other hand, there may be limited space available into which the landing gear must stow.

It is known to use landing gear which can be selectively shortened for stowage and lengthened when deployed, so as to meet both design constraints. However, the actuators required to lengthen and shorten such landing gear add to the weight and expense of the aircraft, and checking and servicing these additional actuators can add further cost. Also, the actuators themselves take up space, meaning that while the landing gear can be stowed into a shorter space (along the roll axis) the space may need to be wider (along the pitch axis) and/or taller (along the yaw axis). Furthermore, the need to lengthen/shorten the landing gear when appropriate can increase the burden placed on the pilot or on automatic control systems.

SUMMARY

The disclosure herein seeks to mitigate one or more of the above-mentioned problems. Alternatively or additionally, the disclosure herein seeks to provide an improved or alternative aircraft, landing gear or method of retracting a landing gear.

According to a first aspect of the disclosure herein there is provided an aircraft having a forward direction and an aft direction and having a landing gear which is movable between stowed and deployed configurations, the landing gear comprising:

- a main leg with a proximal end pivotably attached to a first point on an airframe of the aircraft by a first pivot joint, and a support leg with a proximal end pivotably attached to a second point on the airframe by a second pivot joint;
- a wheel arm pivotably attached to a distal end of the main leg by a third pivot joint and pivotably attached to a distal end of the support leg by a fourth pivot joint, the wheel arm having a wheel support for supporting one or more wheels, wherein:
- the landing gear is movable from the deployed configuration towards the stowed configuration by pivoting the main leg and the support leg aft about the first and second pivot joints respectively, thereby moving the wheel arm aft and upward along a yaw axis of the aircraft;
- with the landing gear in the deployed configuration the support leg is positioned forward of the main leg and the wheel support is positioned forward of the third pivot joint; and
- the main leg, support leg and wheel arm form a triple-rocker four-bar linkage, with the airframe holding the first and second pivot joints stationary so as to form the fixed link, such that pivoting the main leg and support leg aft about the first and second pivot joints respectively pivots the wheel arm about the third pivot joint and moves the wheel support towards the first pivot joint.

With the landing gear being stowed by pivoting the main leg and support leg aft, and with aft pivoting of the main leg and support leg pivoting the wheel arm and moving the wheel support towards the first pivot joint, the kinematics of stowage of the landing gear can allow the length of the landing gear (i.e the distance between the wheel support and the first pivot) to automatically reduce as the landing gear is moved from the deployed configuration to the stowed configuration. This automatic shortening can allow the landing gear to fulfil conflicting requirements in terms of sufficient ground clearance and stowage into a small space, without requiring an actuator and control system to be provided for selectively shortening it. Removing the need for such an actuator can reduce the overall weight and/or cost of the landing gear, and thus of the aircraft as a whole. Instead or as well, it may reduce the service requirements of the landing gear (and thus of the aircraft), may allow the landing gear to be stowed into a narrower and/or shorter space, and/or may reduce the control burden placed on the pilot or on automatic control systems.

The automatic retraction being provided via a triple-rocker four-bar linkage may provide further benefit e.g. in terms of simplicity (and thus ease of production, for example), ease of maintenance and/or strength. In contrast, an arrangement with a support leg received inside the main leg may be particularly difficult to service due to components being nested within one another, and/or may be relatively weaker in one or more directions (for instance in torsion and/or when subjected to drag loads).

For the avoidance of doubt, as would be understood by the skilled person a triple-rocker four-bar linkage is a type of four-bar linkage in which each of the three movable links can only pivot back and forth, rather than being able to make a complete revolution. As would be understood by the skilled person, the fixed link of a four-bar linkage, sometimes called the "frame" or the "ground link", is the link which remains fixed (i.e. stationary) within the frame of reference of the linkage. It is not intended to imply that the fixed link cannot be moved along with the entirety of the four-bar linkage, or that it is necessarily "fixed" to any specific component by any specific mechanism.

For the avoidance of doubt, reference to the support leg being positioned forward of the main leg is not intended to mean that the support leg must be positioned directly in front of the main leg, and is not intended to preclude the possibility of some part of the main leg being in front of some part of the support leg. For the avoidance of doubt, a support leg may be considered to be forward of a main leg if more of the support leg is forward of the main leg than behind it. Equally, reference to the wheel support being forward of the third pivot point is not intended to require any part of the wheel support to be directly in front of the third pivot point.

The main leg, support leg and wheel arm may define respective centerlines which are positioned substantially in the same plane.

These components being centered on the same plane may allow the four-bar linkage to be advantageously strong and/or stable, in particular when subjected to loads acting in that plane. If in contrast those components had centerlines which weren't in the same plane, loading in a plane of one or two of those components could be more likely to give rise to an unbalanced load which could encourage bending or twisting deformation of the four-bar linkage.

Nonetheless, in some embodiments the main leg, support leg and wheel arm may have centerlines which are not in the same plane. In such embodiments two of the components (for instance the main leg and the support leg) may or may not have centerlines which are in the same plane.

The support leg may comprise a shock absorber which allows the proximal and distal ends of the support leg to be resiliently movable towards one another.

This can allow the landing gear to absorb shocks (for instance from the wheels touching down during a landing, or hitting a bump while the aircraft is on the ground) rather than transmitting the full impact of those shocks to the airframe.

As an alternative, the support leg may be substantially rigid, whereupon shock absorbing may be provided (where necessary) by the main leg and/or by the wheel arm for example.

With the landing gear in the deployed configuration, the wheel support may be forward of the fourth pivot joint.

This may allow the wheel to be positioned advantageously far forward, for instance where this is desirable to ensure that the ground contact point of the landing gear is positioned relatively far forward (which may be desirable depending on the position of the center of gravity of the aircraft).

As an alternative, the wheel support may be provided on the wheel arm between the third and fourth pivot joints.

With the landing gear in the deployed configuration, the wheel support may be lower than the fourth pivot point along the yaw axis of the aircraft.

With the wheel support so positioned, the landing gear may be able to accommodate a larger upward deflection of the wheel support (due to the aircraft touching down or the wheel(s) hitting a bump in a runway during takeoff or landing, for instance) before another part of the landing gear (such as a part of the wheel arm near to the third pivot joint) becomes potentially vulnerable to contact with the ground.

With the landing gear in the deployed configuration, the first pivot joint may be higher than the second pivot joint along the yaw axis of the aircraft.

This can allow the first and second pivot joints to be placed a significant distance apart (which may be beneficial for the kinematics of the four-bar linkage), without them needing to be spaced apart along the roll axis of the aircraft to as great an extent. Avoiding the need for the first and second pivot joints to be spaced apart along the roll axis can allow the landing gear to be advantageously short in that direction when stowed, compounding the benefits of the reduction in length which the four-bar linkage may provide.

Nonetheless, as an alternative the first and second pivot joints may be positioned at the same point along the yaw axis, or the first pivot joint may be lower than the second pivot joint along the yaw axis.

A straight line extending between the first and second pivot points may be positioned at an angle of at least 40 degrees, for instance at least 50 degrees or at least 60 degrees, to a plane containing a pitch axis and a roll axis of the aircraft This can increase the extent to which the first and second pivot joints can be placed a significant distance apart without them needing to be spaced apart along the roll axis of the aircraft.

For the avoidance of doubt, reference to the angle between a line and a plane refers to the smaller of the two angles made between the line and the plane. As an illustration, the above arrangement does not cover the situation where the line intersects the plane at an angle of 30 degrees, even if it is also considered that the line intersects the plane at 150 degrees.

The aircraft may further comprise a stowage actuator which is arranged to act on the main leg so as to move the landing gear between the stowed and deployed configurations.

The stowage actuator acting on the main leg may allow it to be located at a position in which it can easily be accommodated within the aircraft.

In such an arrangement the aircraft may further comprise an additional stowage actuator which is arranged to arranged to act on the support leg so as to move the landing gear between the stowed and deployed configurations. As an alternative, the support leg may not be acted on directly by a stowage actuator and may be pivoted about the second pivot joint due to movement of the main leg by the stowage actuator.

The aircraft may further comprise a rear sidestay positioned to brace the landing gear against drag loads.

Due to the aftward pivotability of the main leg and support leg, the increased resistance to drag loads provided by the rear sidestay may be of particular benefit.

The rear sidestay may comprise two pivotably-coupled sections which are configured to fold during movement of the landing gear from the deployed configuration to the stowed configuration.

This may be an advantageously simple mechanism for avoiding the presence of the sidestay obstructing the stowing of the landing gear (and the shortening of the landing gear provided thereby).

As an alternative, the sidestay may be detachable from one of its mounting points and foldable as a single piece, for example.

The rear sidestay may be positioned to brace the main leg.

The rear sidestay being positioned to brace the main leg may allow it to be provided at a location at which it can easily be accommodated within the aircraft.

As an alternative, the rear sidestay may be positioned to brace the support leg, for example.

The landing gear may be a main landing gear of the aircraft.

The main landing gear of an aircraft conventionally handles higher loads therefore must be more robust. Instead or as well, there are often tighter design constraints on the space into which a main landing gear must stow. Accordingly, one or more of the advantages discussed above may be of particular benefit to main landing gear.

As an alternative the landing gear may be a nose landing gear.

The aircraft may be a blended wing body aircraft.

Such an aircraft often has particularly tight design constraints regarding the length of the space into which the landing gear must be stowed, but often less tight constraints on the height of the space. One or more of the advantages discussed above may therefore be of particular benefit to such aircraft.

The distance between the wheel support and the first pivot joint when the landing gear is in the stowed configuration may be at least 100 mm, for instance at least 200 mm or at least 300 mm, smaller than when the landing gear is in the deployed configuration.

Indeed, the distance between the wheel support and the first pivot joint when the landing gear is in the stowed configuration may be at least 500 mm, for instance at least 750 mm or at least 1000 mm, smaller than when the landing gear is in the deployed configuration.

Such a significant change in length may advantageously increase the extent to which the landing gear can fulfil the contrasting design constraints of length when deployed and length when stowed.

According to a second aspect of the disclosure herein there is provided a landing gear for an aircraft according to the first aspect of the disclosure herein.

Such a landing gear may provide one or more of the advantages discussed above in respect of the first aspect of the disclosure herein.

According to a third aspect of the disclosure herein there is provided a method of retracting a landing gear of an aircraft which hass a forward direction and an aft direction, the landing gear comprising:

- a main leg with a proximal end pivotably attached to a first point on an airframe of the aircraft by a first pivot joint, and a support leg with a proximal end pivotably attached to a second point on the airframe by a second pivot joint; and
- a wheel arm pivotably attached to a distal end of the main leg by a third pivot joint and pivotably attached to a distal end of the support leg by a fourth pivot joint, the wheel arm having a wheel support for supporting one or more wheels, the method comprising:

- providing the landing gear in a deployed configuration, with the support leg positioned forward of the main leg and the wheel support positioned forward of the third pivot joint; and
- moving the landing gear towards a stowed configuration by pivoting the main leg and the support leg aft about the first and second pivot joints respectively, thereby moving the wheel arm aft and upward along a yaw axis of the aircraft,
- wherein the main leg, support leg and wheel arm form a triple-rocker four-bar linkage, with the airframe holding the first and second pivot joints stationary so as to form the fixed link, the aft pivoting of the main leg and support leg pivoting the wheel arm about the third pivot joint and moving the wheel support towards the first pivot joint.

With the main leg and support leg pivoting aft to stow the landing gear, and with pivoting the main leg and support leg aft pivoting the wheel arm and moving the wheel support towards the first pivot joint, the length of the landing gear (i.e the distance between the wheel support and the first pivot) can automatically reduce as the landing gear is stowed. This automatic shortening can allow the landing gear to fulfil conflicting requirements in terms of sufficient ground clearance and stowage into a small space, without requiring an actuator and control system to be provided for selectively shortening it. Removing the need for such an actuator can reduce the overall weight and/or cost of the landing gear, and thus of the aircraft as a whole. Instead or as well, it may reduce the service requirements of the landing gear (and thus of the aircraft), may allow the landing gear to be stowed into a narrower and/or shorter space, and/or may reduce the control burden placed on the pilot or on automatic control systems.

The automatic retraction being provided via a triple-rocker four-bar linkage may provide further benefit e.g. in terms of simplicity (and thus ease of production, for example), ease of maintenance and/or strength. In contrast, an arrangement with a support leg received inside the main leg may be particularly difficult to service due to components being nested within one another, and/or may be relatively weaker in one or more directions (for instance in torsion and/or when subjected to drag loads).

It will of course be appreciated that features described in relation to one aspect of the disclosure herein may be incorporated into other aspects of the disclosure herein, where appropriate.

BRIEF DESCRIPTION OF THE DRAWINGS

Embodiments of the disclosure herein will now be described by way of example only with reference to the accompanying schematic drawings of which.

DETAILED DESCRIPTION

Figure 1:
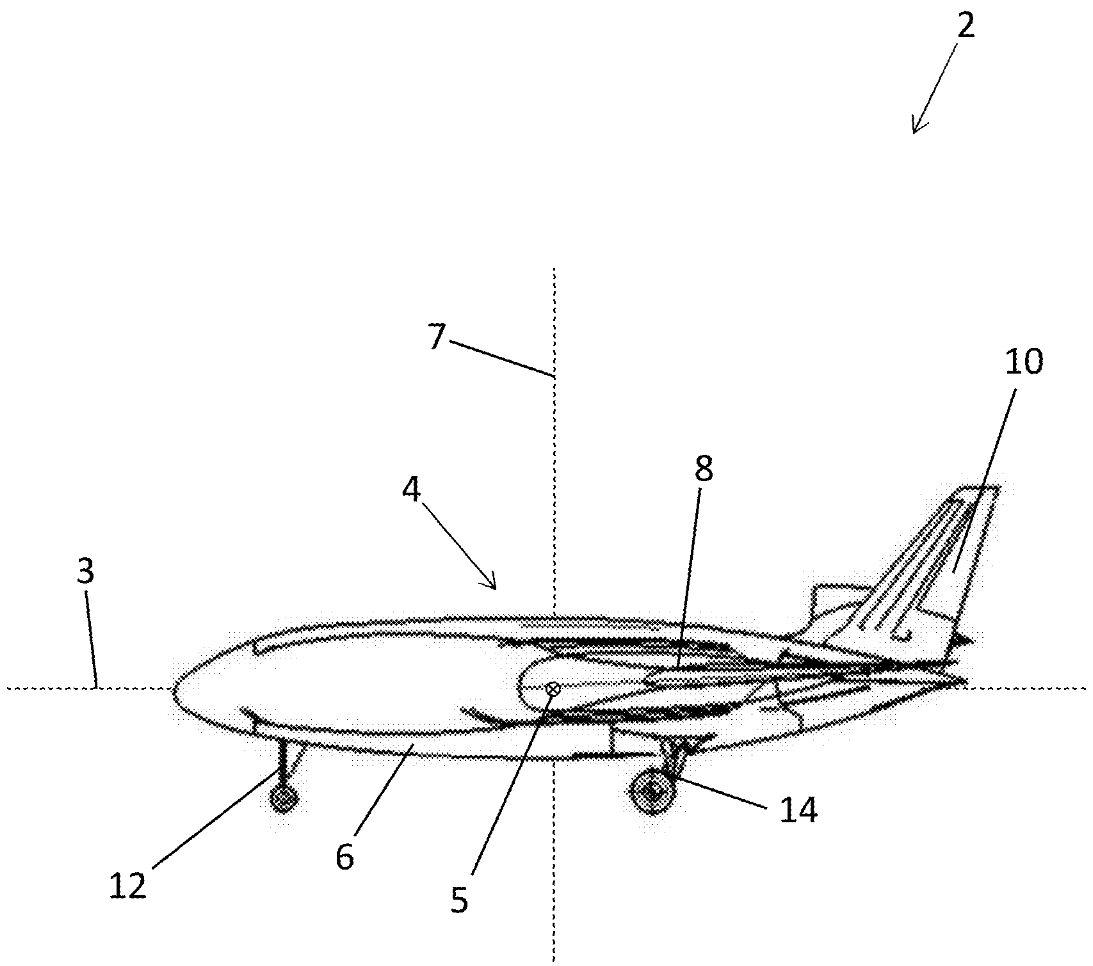
FIG. 1 shows a side view of an aircraft according to an embodiment of the disclosure herein.

FIG. 1 shows an aircraft 2 according to an embodiment of the disclosure herein. It has an airframe 4 made up of a fuselage 6, two wings 8 and a pair of tail fins 10 (one of which is visible from the perspective of FIG. 1). The aircraft 2 of this embodiment is of the blended wing body type, meaning that there is no clear dividing line between the fuselage 6 and the wings 8. The aircraft has a fore direction and an aft direction along a roll axis 3 of the aircraft 2, and also has a pitch axis 5 and a yaw axis 7.

Figure 2:
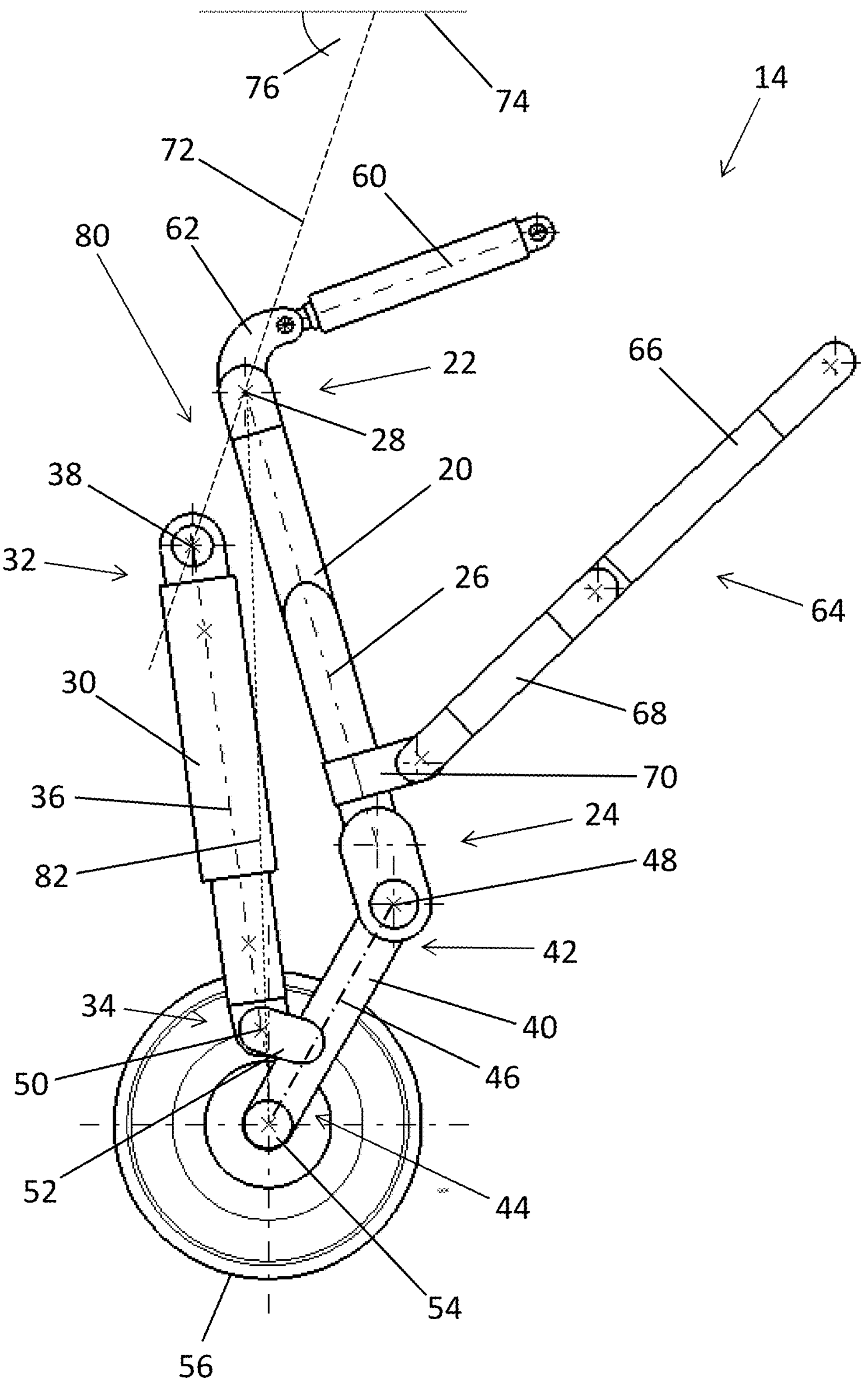
FIG. 2 shows a side view of a main landing gear of the aircraft of FIG. 1, in a deployed configuration.

The aircraft 2 has a nose landing gear 12 and a pair of main landing gear 14 (one of which is visible from the perspective of FIG. 1). The nose landing gear 12 is not material to the disclosure herein and will not be described in detail. FIG. 2 shows one of the main landing gear 14 in isolation. The two main landing gear 14 are substantially identical, so the description below applied equally to each.

Referring now to FIG. 2 in combination with FIG. 1, each main landing gear 14 has a main leg 20, a support leg 30 and a wheel arm 40. The main leg 20 extends from a proximal end 22 to a distal end 24 along a centerline 26, and the proximal end 26 is pivotably attached to a first point on the airframe 4 by a first pivot joint 28. The support leg 30 extends from a proximal end 32 to a distal end 34 along a centerline 36, and is pivotably attached to a second point on the airframe 4 by a second pivot joint 38. With the landing gear 14 in the configuration shown in FIGS. 1 and 2, the support leg 30 is positioned forward of the main leg 20.

The wheel arm 40 of this embodiment extends from a proximal end 42 to a distal end 44 along a centerline 46. The wheel arm 40 is pivotably attached to the distal end 24 of the main leg 20 by a third pivot joint 48, and pivotably attached to the distal end 36 of the support leg 30 by a fourth pivot joint 50 via a pair of mounting tabs 52 (one of which is visible in FIG. 3. The wheel arm 40 also has a wheel support 54 in the form of an axle which supports a pair of wheels 56 (one of which is visible in FIG. 2). With the landing gear 14 in the configuration shown in FIGS. 1 and 2, the wheel support 54 is positioned forward of the third pivot joint 48, forward of the fourth pivot joint 50, and lower than the fourth pivot joint 50 along the yaw axis 7 of the aircraft 2 (which is vertical from the perspective of FIGS. 1 and 2).

The landing gear 14 also has a stowage actuator 60 in the form of a hydraulic cylinder which is arranged to act on the main leg 20, more particularly a projection 62 at the proximal end 22 of the main leg 20. The landing gear 14 also has a rear sidestay 64 made up of a proximal section 66 and a distal section 68 which are pivotably coupled to one another to allow the two sections 66, 68 to fold. The rear sidestay 64 is positioned to brace the landing gear against drag loads (e.g. loads urging the wheels 56 backwards relative to the rest of the aircraft 2). In this case, the rear sidestay 64 is positioned to brace the main leg 20. The sidestay 64 extends from a mounting point on the airframe 4 to a mounting lug 70 of the main leg 20.

It is noteworthy that the centerlines 26, 36, 46 of the main leg 20, support leg 30 and wheel arm 40 of the landing gear all lie in the same plane. Also, the four pivot joints 28, 38, 48, 50 are all positioned to define pivot axes which are parallel to one another. The pivot axes of the pivot joints 28, 38, 48, 50 all run normal to the plane in which the centerlines 26, 36, 46 lie. It is also noteworthy that in this embodiment the first pivot joint 28 is positioned higher than the second pivot joint 38 along the yaw axis 7 of the aircraft 2 (which, as noted above, is vertical from the perspective of FIGS. 1 and 2). Indeed, in this case a straight line 72 extending between the first and second pivot joints 28, 38 intersects a plane 74 containing the pitch and yaw axes 5, 7 of the aircraft (a horizontal plane running into the page from the perspective of FIGS. 1 and 2) at an angle 76 of around 70 degrees. The first pivot joint 28 is thus positioned relatively far above the second pivot joint 38 along the yaw axis 7 but relatively close behind the second pivot joint 38 along the roll axis 3.

Figure 3:
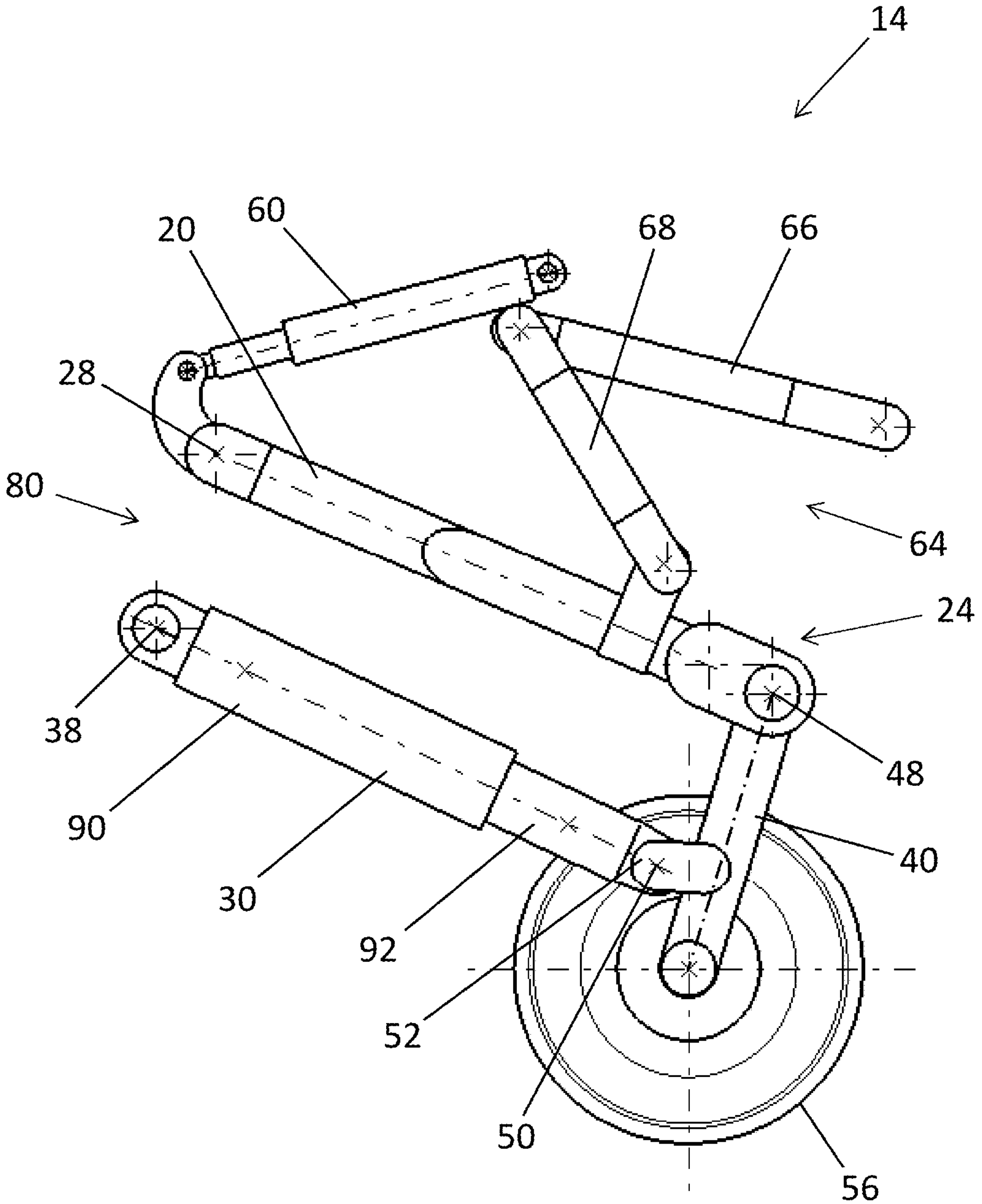
FIG. 3 shows a side view of the landing gear of FIG. 2, in a configuration between the deployed configuration and a stowed configuration.
Figure 4:
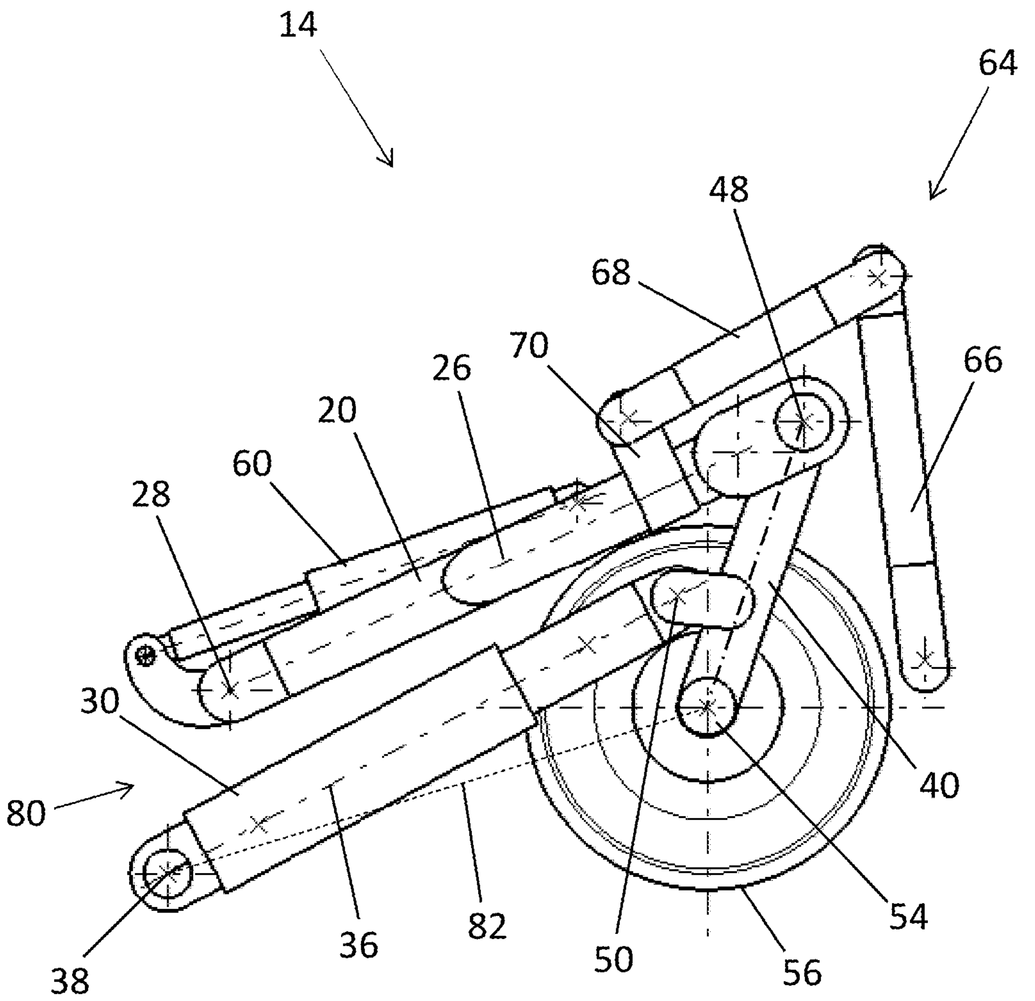
FIG. 4 shows a side view of the landing gear of FIGS. 2 and 3 in the stowed configuration.
Figure 5:
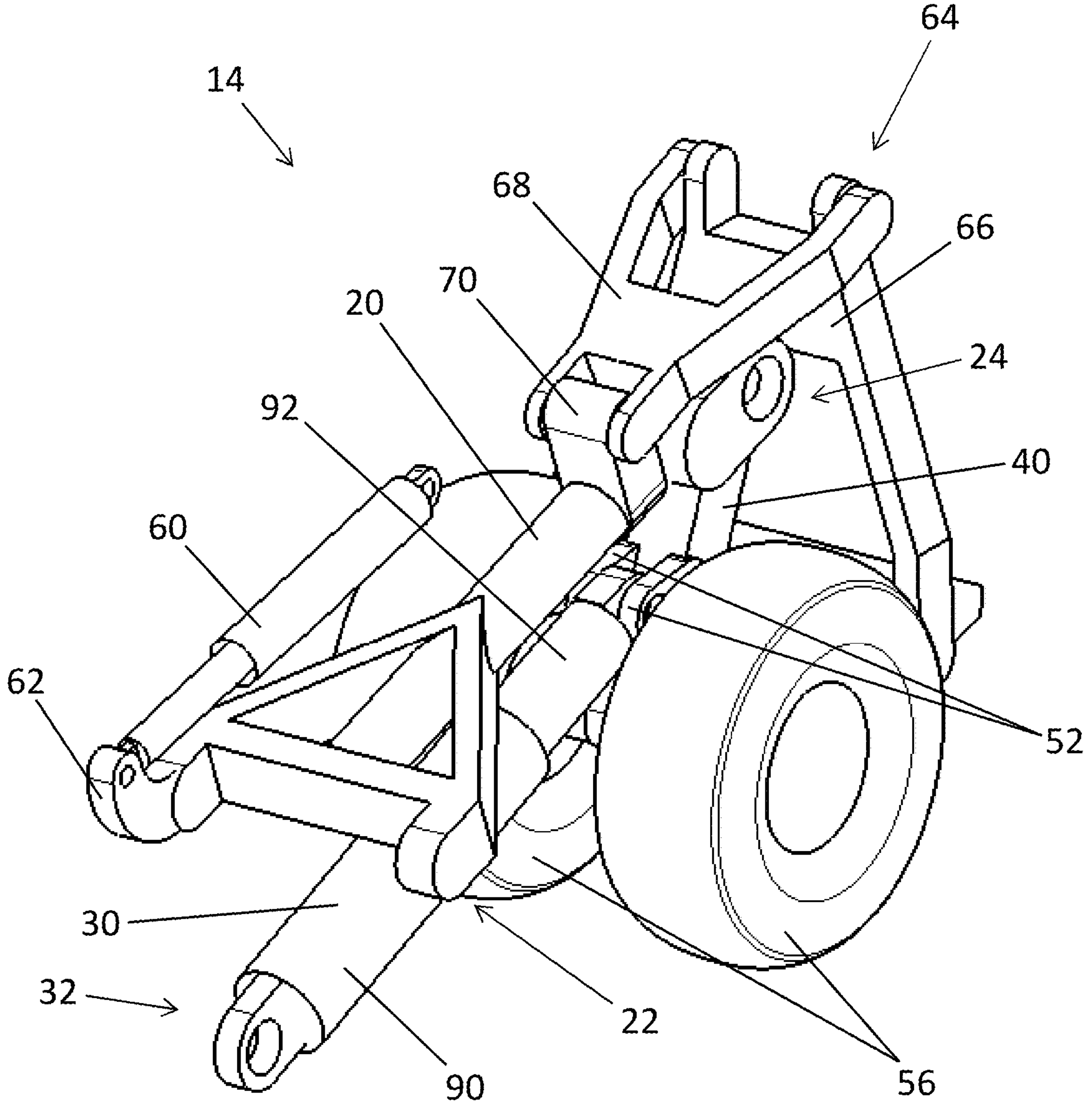
FIG. 5 shows a perspective view of the landing gear of FIG. 2 to 4 in the stowed configuration.

FIGS. 1 and 2 show the landing gear 14 in a deployed configuration. The landing gear 14 is movable to a stowed configuration. FIG. 3 shows the landing gear 14 in a configuration which is part way between the deployed configuration and the stowed configuration, and FIGS. 4 and 5 show the landing gear 14 in the stowed configuration. FIGS. 1 to 5 will now be referred to in combination.

The landing gear 14 is movable from the deployed configuration towards the stowed configuration by pivoting the main leg 20 aft about the first pivot joint 28 and pivoting the support leg 30 aft about the second pivot joint 38. In the present embodiment this is achieved by extending the stowage actuator 60, forcing the projection 62 forward and thereby pivoting the main leg 20 rearward. The support leg 30 also pivots aft by virtue of being connected to the main leg 30 by the wheel arm 40.

Pivoting the main leg 20 aft about the first pivot joint 28 and pivoting the support leg 30 aft about the second pivot joint 38 has the effect of moving the distal ends 24, 34 of the legs 20, 30 aft and upward along the yaw axis 7. The wheel arm 40, being attached to the distal ends 24, 34 of the legs 20, 30, is moved similarly. The rear sidestay 64 accommodates this movement by folding—the proximal section 66 and the distal section 68 pivot towards one another.

The main leg 20, support leg 30 and wheel arm 40 form a triple-rocker four-bar linkage 80. The airframe 4 holds the first pivot joint 28 and the second pivot joint 38 stationary, forming the fixed link. The wheel arm 40 forms the connecting rod of the four-bar linkage 80. Due to the formation of the four-bar linkage 80 (and the relative positions of the main leg 20 and support leg 30, and the wheel support 54 and the third pivot joint 48), as the legs 20, 30 pivot backwards about the pivot joints 28, 38 the wheel arm 40 pivots about the third pivot joint 48 (clockwise relative to the main leg 20 from the perspective of FIGS. 1 to 5) and the wheel support 54 moves towards the first pivot joint 28.

With the wheel support 54 moving towards the first pivot joint 28 as the landing gear 14 moves from the deployed configuration to the stowed configuration, the overall length 82 of the landing gear is reduced for stowage. In the present embodiment the overall length 82 of the landing gear 14 is 1250 mm shorter when in the stowed configuration than when in the deployed configuration.

It is noteworthy that in the present embodiment the support leg 30 takes the form of a shock absorber, more particularly an oleo-pneumatic shock absorber. The proximal end 32 of the support leg is provided on a chamber 90 containing a volume of oil and gas, and the distal end 34 is provided on a piston 92 which extends into that chamber. The ends 32, 34 of the support leg 32 are movable towards one another, which inserts the piston 92 further into the chamber 90. This has the effect of compressing (or further compressing) the gas in the chamber 90, and the compressed gas exerts a restorative force on the piston which biases the ends 32, 34 of the support leg away from each other again. Also, movement of the piston 92 into and out of the chamber 90 moves the oil around the chamber 90, dissipating energy through viscous friction.

Figure 6:
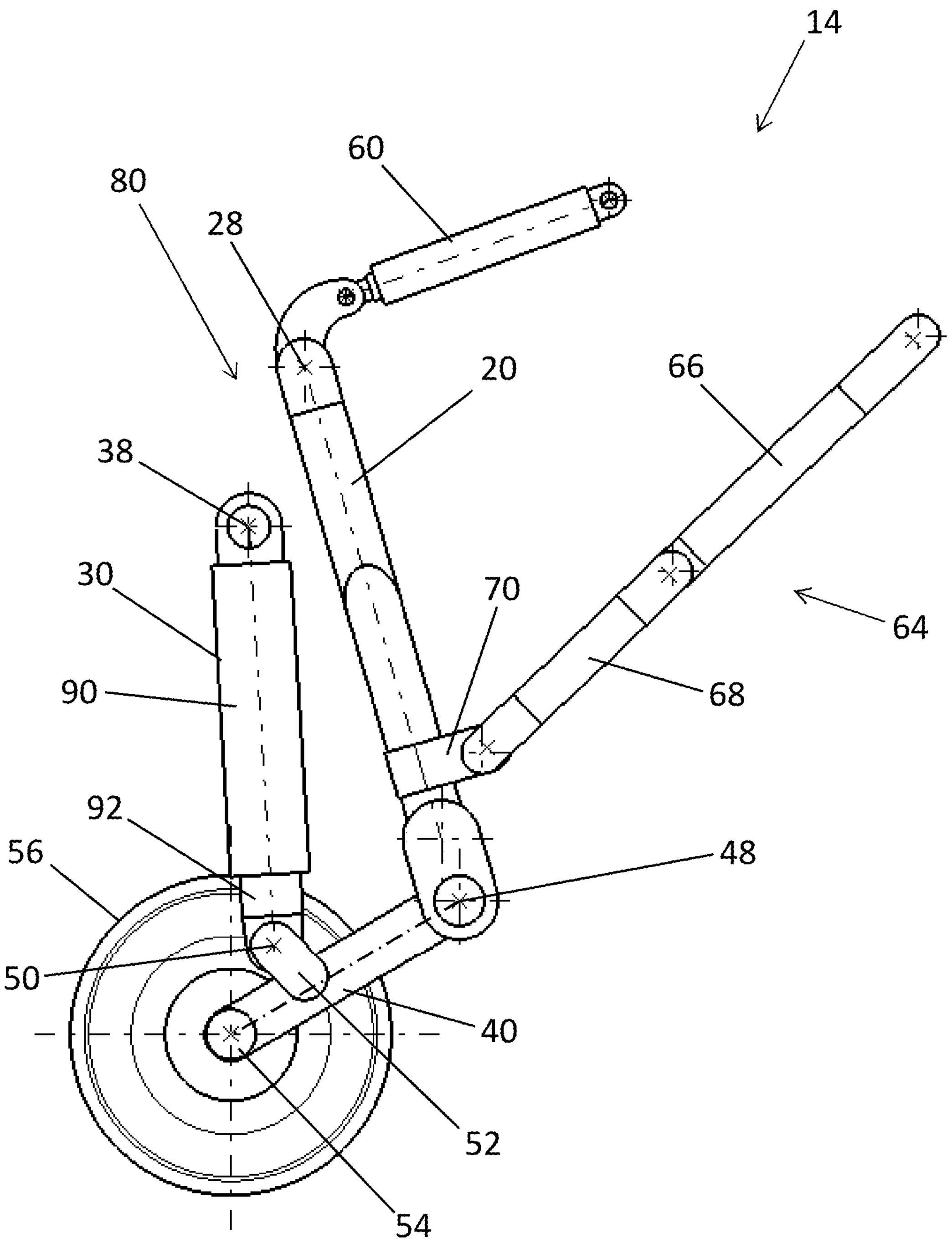
FIG. 6 shows a side view of the landing gear of FIGS. 2 to 5, with proximal and distal ends of a support leg of the landing gear having been moved towards one another.

Accordingly, the ends 32, 34 of the support leg 30 are resiliently movable towards one another. The ends 32, 34 of the support leg 30 being movable in this way allows the wheel arm 40 to pivot upward about the third pivot joint 48 when the landing gear 14 is deployed and under compressive load (i.e. when the aircraft 2 is resting on the wheels 56). Further, if the landing gear 14 is subject to a shock loading (for instance when the aircraft touches down, or hits a bump when travelling along a runway) the wheels 54 can move further upward to absorb the shock rather than transmitting it to the airframe 4. FIG. 6 shows the landing gear 14 with the ends 32, 34 of the support leg 30 moved towards one another as far as possible (i.e. with the wheel arm 40 pivoted up as far as possible), in contrast to FIGS. 2 to 5 which show the landing gear 14 with no vertical load applied (i.e. with the ends 32, 34 of the support leg 30 as far apart as possible). When the aircraft 2 rests on the ground, the landing gear 14 would be at a position between the two extremes shown in FIGS. 2 and 6, with the ends 32, 34 of the support leg 30 moved towards each other to some extent, between the two extremes of its range of motion.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

The term 'or' shall be interpreted as 'and/or' unless the context requires otherwise.

It should be understood that modifications, substitutions, and alternatives of the invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft having a forward direction and an aft direction and having a landing gear which is movable between stowed and deployed configurations, the landing gear comprising:

a main leg with a proximal end pivotably attached to a first point on an airframe of the aircraft by a first pivot joint, and a support leg with a proximal end pivotably attached to a second point on the airframe by a second pivot joint; and a wheel arm pivotably attached to a distal end of the main leg by a third pivot joint and pivotably attached to a distal end of the support leg by a fourth pivot joint, the wheel arm having a wheel support for supporting one or more wheels;

wherein the landing gear is movable from the deployed configuration towards the stowed configuration by pivoting the main leg and the support leg aft about the first and second pivot joints respectively, thereby moving the wheel arm aft and upward along a yaw axis of the aircraft;

wherein with the landing gear in the deployed configuration the support leg is positioned forward of the main leg and the wheel support is positioned forward of the third pivot joint; and wherein the main leg, support leg and wheel arm form a triple-rocker four-bar linkage, with the airframe holding the first and second pivot joints stationary to form a fixed link, such that pivoting the main leg and support leg aft about the first and second pivot joints respectively pivots the wheel arm about the third pivot joint and moves the wheel support towards the first pivot joint.

2. The aircraft according to claim 1, wherein the main leg, support leg and wheel arm define respective centerlines which are positioned substantially in a same plane.

3. The aircraft according to claim 1, wherein the support leg comprises a shock absorber which allows the proximal and distal ends of the support leg to be resiliently movable towards one another.

4. The aircraft according to claim 1, wherein with the landing gear in the deployed configuration, the wheel support is forward of the fourth pivot joint.

5. The aircraft according to claim 1, wherein with the landing gear in the deployed configuration, the wheel support is lower than the fourth pivot point along the yaw axis of the aircraft.

6. The aircraft according to claim 1, further comprising a stowage actuator which is arranged to act on the main leg to move the landing gear between the stowed and deployed configurations.

7. The aircraft according to claim 1, wherein the landing gear is a main landing gear of the aircraft.

8. The aircraft according to claim 1, wherein the aircraft is a blended wing body aircraft.

9. The aircraft according to claim 1, wherein a distance between the wheel support and the first pivot joint when the landing gear is in the stowed configuration is at least 500 mm smaller than when the landing gear is in the deployed configuration.

10. The aircraft according to claim 1, wherein with the landing gear in the deployed configuration, the first pivot joint is higher than the second pivot joint along the yaw axis of the aircraft.

11. The aircraft according to claim 10, wherein a straight line extending between the first and second pivot points is positioned at an angle of at least 50 degrees to a plane containing a pitch axis and a roll axis of the aircraft.

12. The aircraft according to claim 1, further comprising a rear sidestay positioned to brace the landing gear against drag loads.

13. The aircraft according to claim 12, wherein the rear sidestay comprises two pivotably-coupled sections which are configured to fold during movement of the landing gear from the deployed configuration to the stowed configuration.

14. The aircraft according to claim 12, wherein the rear sidestay is positioned to brace the main leg.

15. A method of retracting a landing gear of an aircraft which has a forward direction and an aft direction, the landing gear comprising:

a main leg with a proximal end pivotably attached to a first point on an airframe of the aircraft by a first pivot joint, and a support leg with a proximal end pivotably attached to a second point on the airframe by a second pivot joint; and a wheel arm pivotably attached to a distal end of the main leg by a third pivot joint and pivotably attached to a distal end of the support leg by a fourth pivot joint, the wheel arm having a wheel support for supporting one or more wheels;

the method comprising:

providing the landing gear in a deployed configuration, with the support leg positioned forward of the main leg and the wheel support positioned forward of the third pivot joint; and moving the landing gear towards a stowed configuration by pivoting the main leg and the support leg aft about the first and second pivot joints respectively, thereby moving the wheel arm aft and upward along a yaw axis of the aircraft;

wherein the main leg, support leg and wheel arm form a triple-rocker four-bar linkage, with the airframe holding the first and second pivot joints stationary to form the fixed link, the aft pivoting of the main leg and support leg pivoting the wheel arm about the third pivot joint and moving the wheel support towards the first pivot joint.

* * * * *